UNITED STATES PATENT OFFICE.

PER GÖSTA EKSTRÖM, OF SKUTSKÄR, SWEDEN.

METHOD OF PRODUCING CELLOSE.

1,087,743.      Specification of Letters Patent.      Patented Feb. 17, 1914.

No Drawing.      Application filed August 5, 1911. Serial No. 642,464.

*To all whom it may concern:*

Be it known that I, PER GÖSTA EKSTRÖM, a subject of the King of Sweden, and resident of Skutskär, in the Kingdom of Sweden, have invented certain new and useful Improvements in the Method of Producing Cellose, of which the following is a specification.

If a concentrated acid, for instance sulfuric acid containing 70–80 per cent. of $H_2SO_4$, is allowed to react upon cellulose, or a material containing cellulose, a product called acid cellulose is first formed and then, after the reaction has continued for a sufficiently long time, another product called cellose is formed. This product, viz., the cellose, can be transformed into fermentable sugar by being boiled with a diluted acid under atmospheric pressure. The cellose can, thus, be used as a starting material for the production of sugar or alcohol. During the above mentioned formation of the cellose, however, some organic acids, such as acetic acid and formic acid, are formed which must be separated from the cellose before the latter is further treated for the production of sugar or alcohol.

The present invention refers to a method according to which the concentrated acid is allowed to react upon the cellulose or the material containing cellulose under a reduced pressure and at a suitable temperature, whereby the advantage is obtained, that the organic acid or acids formed by the said reaction distil off and may be gathered together or separately, if the vacuum and the temperature be suitably adapted. The temperature is dependent on the percentage of moisture in the material and on the strength of the acid.

The following is an example of carrying the method into practice: A suitable quantity of saw dust containing 40% of moisture is exposed to the action of sulfuric acid of 75 per cent. at a temperature of 50° C. under a suitable vacuum and for a time of one hour, the organic acids formed thereby being gathered separately. As to the vacuum the same must of course at all events be adapted in such a manner that the highest output of cellose is obtained.

Having now described my invention, what I claim as new and desire to secure by Letters Patent is:

The method of producing cellose consisting in allowing a concentrated acid to react upon cellulosic material for a time sufficiently long for the formation of cellose and at a temperature adapted to the nature of the reacting substances, to wit: cellulosic material and acid, maintaining during the treatment a vacuum sufficient for allowing the organic acid or acids formed during the same to distil off, substantially as described.

In witness whereof, I have hereunto signed my name in the presence of two subscribing witnesses.

PER GÖSTA EKSTRÖM.

Witnesses:
AXEL EHRNER,
GRETA PRINCE.